July 2, 1963 C. L. COHEN 3,096,446

ELECTRICAL MAGNITUDE SELECTOR

Filed June 8, 1960

INVENTOR.
CHARLES L. COHEN
BY
Lawrence S. Epstein
ATTORNEY 3,096,446
Patented July 2, 1963

3,096,446

ELECTRICAL MAGNITUDE SELECTOR

Charles L. Cohen, Hyattsville, Md., assignor, by mesne assignments, to the United States of America as represented by the Secretary of the Navy Filed June 8, 1960, Ser. No. 34,854
1 Claim. (Cl. 307—88.5)

The present invention relates to electrical magnitude selection and is particularly concerned with such circuits that will work equally well with D.C. or A.C. signals.

Prior art methods used to perform magnitude selection usually involve a relay which connects either of two inputs to an output along with some more or less elaborate scheme for comparing the magnitude of the input voltages and means to energize the relay when one of voltages is greater than the other. Two disadvantages of this type of selector are that their operating time was greater than desired and that only two inputs could be compared with each relay and associated energizing circuit. In addition, to obtain good sensitivity, the energizing circuit is frequently quite complex.

The present device being electrical instead of electro-mechanical eliminates the operating lags and sensitivity problems associated with electro-mechanical magnitude selectors. Further, the particular arrangement of the present device permits comparison of an unlimited number of signals requiring only the addition of two diodes for each signal for which a comparison is being made.

Therefore, an object of this invention is an electrical magnitude selector that may be more simply adapted to provide magnitude comparisons between three or more signals than by prior art devices.

It is also an object to provide an automatic magnitude selector in which the operating time is decreased over such prior art devices.

It is another object to provide an electrical magnitude selector which will select the largest of a multiplicity of input signals.

It is another object to provide increased signal sensitivity without the greater complexity required by the prior art devices.

Still a further object is to provide a magnitude selector which eliminates the largest of a multiplicity of input signals.

Figure 1:
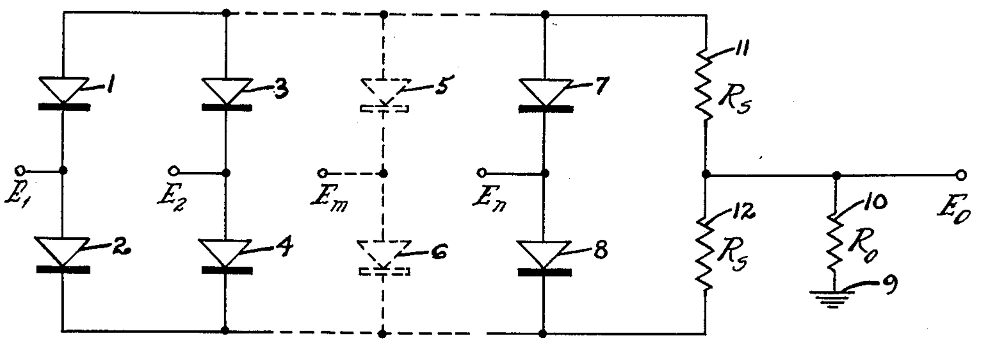
Figure 2:
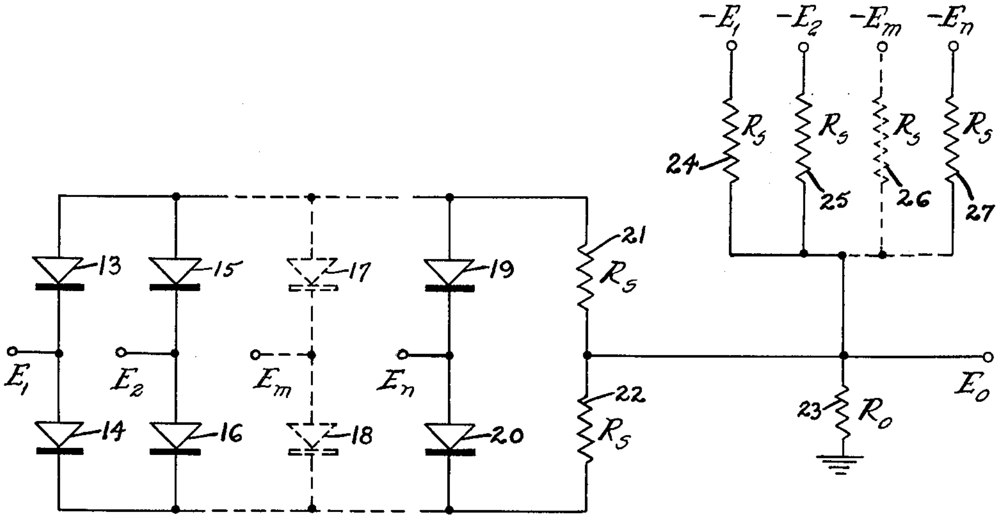

Other objects and many of the attendant advantages of this invention will be readily appreciated as the same becomes better understood by reference to the following detailed description when considered in connection with the accompanying drawings wherein:

FIG. 1 is a schematic wiring diagram of an electrical magnitude selector adapted to select the largest of the signals inserted; and FIG. 2 is a schematic wiring diagram of an electrical magnitude selector adapted to eliminate the largest of the signals inserted.

Referring to FIG. 1, it may be seen that $E_1$ and $E_2$ represent the first two of a series of inputs into the device; $E_m$ represents an indeterminate number of intermediate inputs and $E_n$ represents the last input of the series. One lead from each one of these inputs is connected to the plate of one diode and the cathode of another. For instance, $E_1$ is connected to the plate of diode 1 and the cathode of diode 2. In the same manner, $E_2$, $E_m$ and $E_n$ are each connected to diode doublets consisting respectively of diodes 3 and 4, 5 and 6, and 7 and 8. The diode cathodes which are not connected to the inputs are coupled in parallel to the output resistor 10 by a summing resistor 11 as are the unconnected diode plates by a similar summing resistor 12. Obviously, for proper performance one lead from each of the inputs and the output must be brought to ground 9.

In operation, assuming inputs are of the same phase or same polarity, the diodes connected to the largest input will conduct biasing the other diodes in a nonconducting state. Thus, only the current from the largest signal will flow through the summing resistors to the output current from the other inputs being prevented from so flowing by the biased diodes.

Referring now to FIG. 2, it is seen that this circuit, as the circuit of FIG. 1, contain diode doublets with an input lead from one of the inputs $E_1$, $E_2$, $E_m$ and $E_n$ connected to plate of one and the cathode of the other diode in each diode doublet. It is also shown that the cathodes of diodes 13, 15, 17 and 19 and the plates of diodes 14, 16, 18 and 20 are coupled through the parallel summing network made out of the two summing resistors 21 and 22 and an output resistor 23. In addition, a number of other summing resistors 24, 25, 26 and 27 equal in resistance to 21 and 22, couple each of the inputs reversed in phase to the output resistor 23. Thus, the signal which appears on $E_1$ is phase reversed and coupled to the output resistor 23 through resistor 24 and likewise $-E_2$, $-E_m$ and $-E_n$ are coupled to the output by resistors 25, 26 and 27.

In operation, the diode doublets act, as in FIG. 1, the largest signal causes current to flow through its related diode doublet and biases all the other doublets in an off position thus preventing the flow of the other inputs. However, here the signal developed across the output resistor 23 by the largest input is cancelled by the negative of the signal developed by coupling the inputs phase reversed to the output resistor. Since the largest signal has cut off the other diodes, all the other phase-reversed signals flow freely through their respective summing resistors into the output resistor. Obviously, if the number of inputs were only two the resulting device would be a selector which selected the smaller of the two impressed signals.

Obviously many modifications and variations of the present invention are possible in the light of the above teachings. It is therefore to be understood that within the scope of the appended claim the invention may be practiced otherwise than as specifically described.

What is claimed is:

A magnitude selector for eliminating the largest of a number of electrical signals of all the same polarity or phase including a first multiplicity of diode means having all their plates coupled together and each cathode individually coupled to an input accepting one of the electrical signals so that the largest positive going signal blocks the passage of the other positive going signals, a second multiplicity of diode means having all their cathodes coupled together and each plate individually coupled to an input accepting one of the electrical signals so that the largest negative going signal blocks the passage of all other negative going signals, summing means coupling the coupled plates of the first multiplicity of diode means to the coupled cathodes of the second multiplicity of diode means, output means coupled to said summing means to provide an output proportional to the largest signal and means to subtract this largest signal from the sum of all the other signals.

References Cited in the file of this patent

UNITED STATES PATENTS

| | | |
|---|---|---|
| 2,358,448 | Earp | Sept. 19, 1944 |
| 2,557,729 | Eckert | June 19, 1951 |

| | | |
|---|---|---|
| 2,570,431 | Crosby | Oct. 9, 1951 |
| 2,607,007 | Clark | Aug. 12, 1952 |
| 2,752,489 | Aigrain | June 26, 1956 |
| 2,783,453 | Rose | Feb. 26, 1957 |
| 2,921,981 | Kidd | Jan. 19, 1960 |
| 3,021,514 | Regis et al. | Feb. 13, 1962 |

OTHER REFERENCES

"Exclusive or Circuit," by Walsh, in IBM Technical Disclosure Bulletin, vol. 2, No. 2, August 1959.